May 15, 1962  J. LAFIAN  3,034,670
POWER HOE
Filed Jan. 24, 1958  3 Sheets-Sheet 1
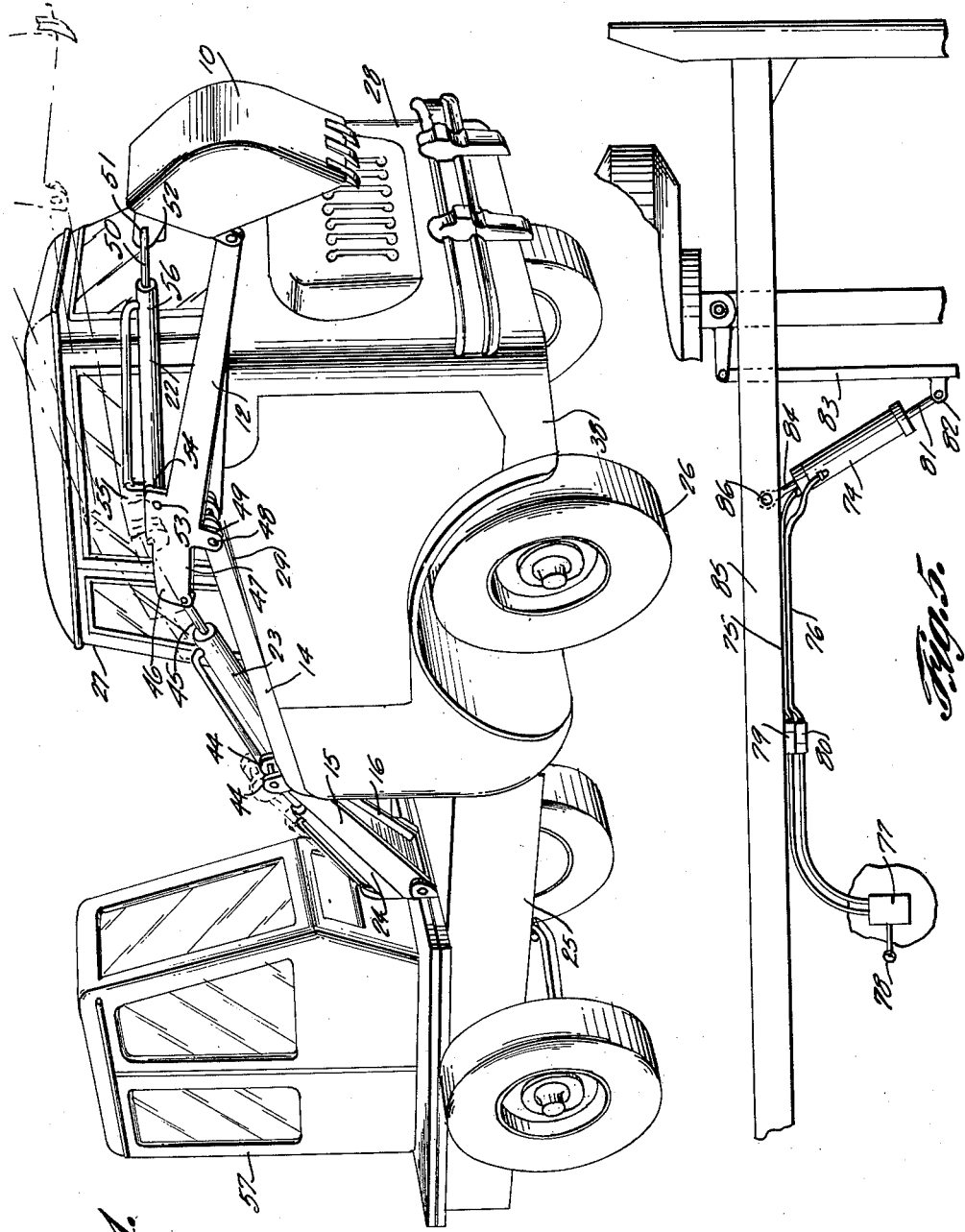
INVENTOR.
John Lafian
BY Victor J.Evans&Co.
ATTORNEYS

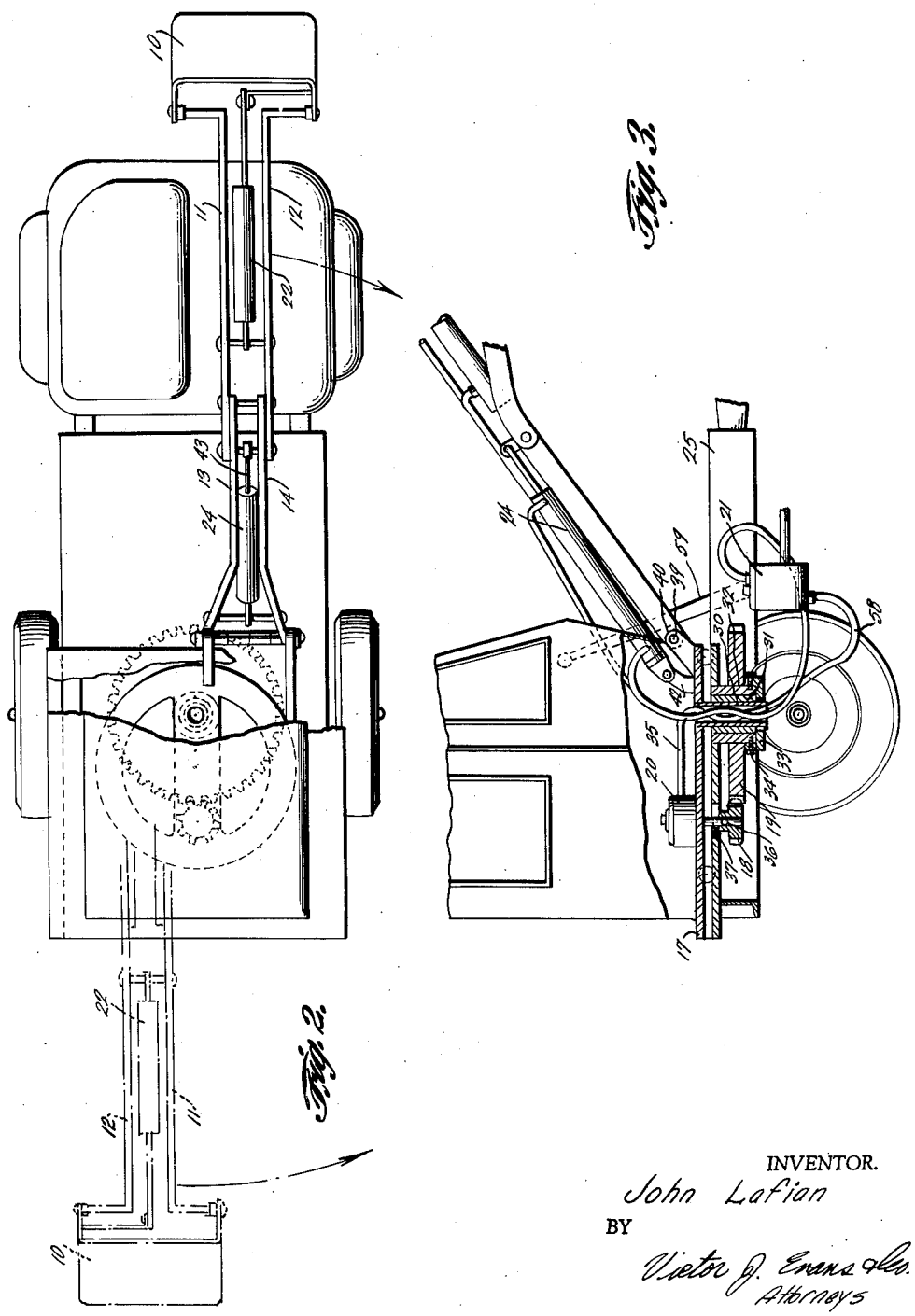

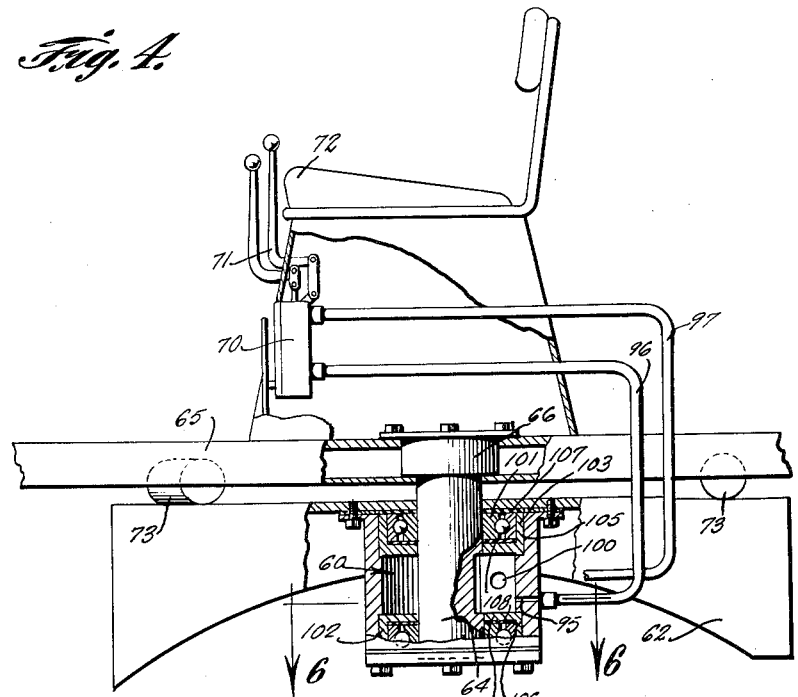
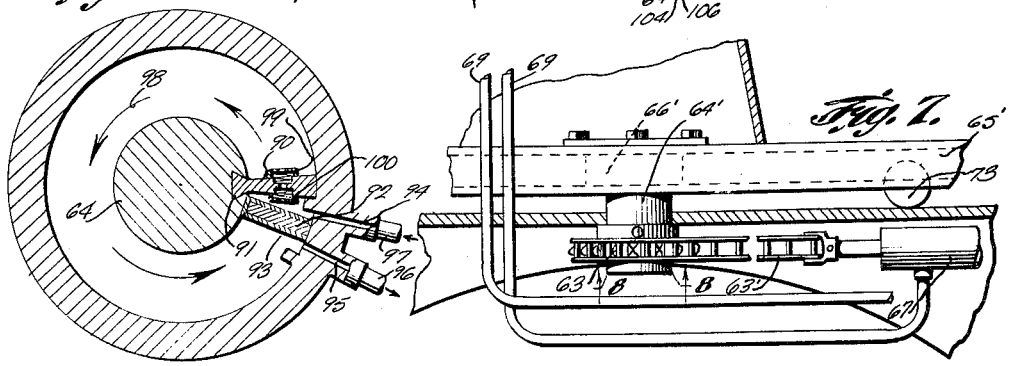
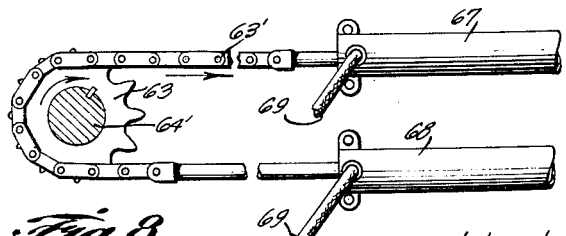

united States Patent Office 3,034,670
Patented May 15, 1962

3,034,670
POWER HOE
John Lafian, Star Rte., Massena, N.Y.
Filed Jan. 24, 1958, Ser. No. 711,083
1 Claim. (Cl. 214—138)

This invention relates to excavating, land leveling, and earth moving equipment, and in particular a jeep truck including a chassis mounted on wheels with an operator's cab having a corner cut away at one side on the forward end to provide a surface for receiving the arm or boom of a back hoe on the forward end, and a turntable operated by a hydraulic motor through 360° on the rear portion with a bucket carried by the arm or boom whereby the bucket travels through 360° and the arm or boom rests upon a surface or shelf of the cut-away portion at one side of the cab for transportation.

This turntable, as used with a jeep, provides a full 360° swing and eliminates one engine of the conventional back hoe or jeep.

The purpose of this invention is to provide a back hoe in which the digging element is mounted to be rotated through 360 degrees and in which the cab of the machine is offset to provide a ledge or surface for receiving the collapsible arm of a bucket, scoop, or the like.

Various types of earth digging and moving equipment have been provided, however, with a conventional hoe which is somewhat similar to a bulldozer or shovel it is substantially impossible to elevate the folding arm on the end of which the digging element is carried sufficiently to rest it upon the top of the cab and it is also difficult to support the arm in a suspended position behind the chassis of the vehicle so that the use of such devices is limited. With this thought in mind this invention contemplates a hoe having a hydraulically actuated motor positioned on a turntable thereof by which the hoe is mounted on a chassis of a vehicle whereby the digging element may be carried through 360 degrees and wherein a portion is chopped from one side of the upper part of the cab to provide a supporting area for the folding or collapsible arm of the digging element.

The object of this invention is, therefore, to provide means for forming a power hoe whereby the hoe may swing through 360 degrees and wherein a seat is provided for the hoe at one side of a cab of the vehicle.

Another object of the invention is to provide a turntable for a hoe wherein the turntable is so designed that it may be actuated through 360 degrees by a hydraulic motor so that the hoe may operate in substantially any position in relation to the chassis of a vehicle upon which the turntable and hoe are mounted.

Another important object of the invention is to provide an improved cab for the tractor of a hoe wherein a shelf may be provided at one side of the cab to carry the hoe.

A further object of the invention is to provide an improved power actuated hoe wherein the arm or boom of the hoe rests upon a solid surface when not in use so that it is not necessary to suspend the double-jointed arm on the rear of the vehicle.

A still further object of the invention is to provide a power actuated hoe that turns through 360 degrees and that rests upon a shelf at one side of the cab when not in use in which the device is of a simple and economical construction.

With these and other objects and advantages in view the invention embodies a chassis mounted on wheels with a tractor having a cab at the forward end and a turntable on the rear portion and in which the cab of the tractor is offset providing a shelf at one side and the hoe is carried by a double-jointed hydraulic cylinder actuated arm from the turntable.

Other features and advantages of the invention will appear from the following description taken in connection with the drawings, wherein:

FIGURE 1 is a perspective view showing the improved hoe with the hoe and supporting arm or boom thereof resting upon a shelf at one side of the cab of the tractor.

FIGURE 2 is a plan view of the improved hoe showing the hoe with the supporting arm thereof positioned on one side of the cab of the tractor in full lines and with the hoe extended for use from the rear of the tractor in broken lines.

FIGURE 3 is a longitudinal section through the turntable mounting of the hoe with parts broken away showing the hydraulically actuated gears for rotating the turntable and also a pump for supplying fluid under pressure to the hydraulic motor and hydraulic cylinders of the arm or boom of the hoe.

FIGURE 4 is a view showing a longitudinal section through the mounting of a turntable operated with a master hydraulic cylinder and having hydraulic control levers positioned in front of the seat of an operator with the levers connected through suitable tubes for controlling all digging and swinging operations of the jeep.

FIGURE 5 is a plan view partly broken away showing a portion of the jeep chassis at one side of the forward end illustrating a hydraulic cylinder for steering the vehicle with fluid under pressure supplied to the cylinder to valves actuated by a lever positioned adjacent the operator's seat of the vehicle.

FIGURE 6 is a transverse sectional view on the line 6—6 of FIGURE 4.

FIGURE 7 is a modification of the invention wherein the turntable is operated with two hydraulic cylinders through a chain and sprocket assembly, and FIGURE 8 is a transverse sectional view on the line 8—8 of FIGURE 7 showing more clearly the chain and sprocket assembly shown in FIGURE 7.

Referring now to the drawings wherein like reference characters denote corresponding parts the improved power hoe of this invention includes a hoe 10 carried by an arm including an outer section formed with bars 11 and 12, an intermediate section formed with bars 13 and 14 and a base section formed with bars 15 and 16, a turntable 17 rotated by a pinion 18 meshing with a stationary gear 19 and actuated by a hydraulic motor 20, a pump 21 for supplying fluid under pressure to the motor 20 and also to cylinders 22, 23, and 24 for actuating the arm of the hoe and a chassis 25 mounted on wheels 26 and provided with an offset cab 27 that is positioned on a tractor 28 and that is positioned at one side of a shelf 29 upon which the sections of the hoe carrying arm rest with the hoe in position for transportation.

The turntable 17 is provided with a hub 30 that is rotatably mounted in a bearing 31 in the chassis 25 of the tractor, and gear 19 is fixedly mounted on a sleeve 32 that is secured to a flange 33 of a stationary strut of the chassis by bolts 34. The hydraulic motor 20 is connected to the pump 21 by a tube 35 and upon the application of fluid pressure of the pump to the motor the pinion 18 rotates carrying the turntable around the gear 19. The pinion 18 is fixedly mounted by a pin 36 on a stub shaft 37 extended from the motor 20. By this means the turntable with the hoe 10 and supporting arm may be rotated through 360 degrees and when not in use the hoe, with the supporting arm is positioned on the shelf 29 of a section 38 of a cab of the tractor 28.

The collapsible or folding arm of the hoe 10, which is conventional, is pivotally mounted by bolts 39 in brackets 40 extended from the turntable 17, the bolt 39 extending through lower ends of the bars 15 and 16 or the inner portion of the arm.

The hydraulic cylinder 24 is pivotally mounted by a bolt 41 in a bracket 42 also extended from the turntable and a piston rod 43 extended from the extended end of the cylinder 24 is pivotally connected to ears 44 of the bars 13 and 14. A piston rod 45 extended from the upper end of the cylinder 23 which is mounted in the bars 13 and 14, is connected by a pin 46 to extensions 47 of the bars 11 and 12 and, as illustrated in FIGURE 1 the bars 11 and 12 are pivotally mounted in the extended ends of the bars 13 and 14 by a pin 48 which extends through ears 49 extended from lower surfaces of the bars 11 and 12.

A piston rod 50 extended from the upper cylinder 22 is pivotally mounted by a pin 51 in a bracket 52 extended from the back of the hoe or scoop 10. The cylinder 22 is pivotally mounted by a pin 53 in extensions 54 on upper edges of the bars 11 and 12. Each of the cylinders 22, 23, and 24, is provided with fluid pressure connections, such as the connections 55 and 56 at the ends of the cylinder 22 whereby with control valves in the cab 27, or in a cab 57 on the jeep or turntable the different sections of the arm are actuated to move the hoe or scoop 10 to substantially any position desired.

The connections 55 and 56 of the cylinder 22 and similar connections of the cylinders 23 and 24 are connected by hose or tubes, such as the hose 58 to the pump 21 and the pump also supplied fluid through the connection 35 to the hydraulic cylinder 20 which operates the pinion 18 so that the turntable travels around the gear 19.

As illustrated in FIGURE 4 a hydraulic cylinder 60 in a housing 61 is mounted directly in the chassis or frame 62 of the jeep with a turntable 65 carried by the upper end 66 of a shaft 64.

The turntable 65 may be operated directly by the hydraulic cylinder 60, FIGURE 4, or the turntable may be rotated by a chain 63' trained over a sprocket 63 carried on the lower end of a shaft 64' to which a turntable 65' is secured to the upper end 66' thereof and also over sprockets actuated by hydraulic cylinders 67 and 68 as illustrated in FIGURE 7 and in my co-pending application filed March 6, 1957, with the Serial Number 644,346. Tubes or hose from the cylinders 67 and 68 and as indicated by the numeral 69 extend upwardly through the tubular shafts 64 and 66 and may be connected as the form shown in FIGURE 4 to a reversing valve 70 actuated by hand levers 71 at the operator's seat 72.

In FIGURES 4 and 6 it is shown that the shaft 64 to which the turntable 65 is secured has a piston 90 keyed thereto by dovetail slot 91 and the piston 90 is mounted for rotation in the housing 61. The housing 61 is provided with a stop partition 92 that is covered with a wear resistant covering 93 and inlet and outlet ports 94 and 95 are positioned on opposite sides of the stop 92. Tubular connections 96 and 97 connect the housing 61 to the reversing valve 70 whereby levers 71 control the operation of the piston 90 within the housing 61. When fluid under pressure is supplied to the housing 61 through port 94 the piston 90 will be caused to rotate in the housing 61 in the direction of the arrows 98 and the piston 90 is provided with relief valves 99 and 100. The shaft 64 is mounted in bearings 101 and 102 that are housed in cup-shaped housings 103 and 104 that are seated in recesses 105 and 106 in the housing 61 and packing rings 107 and 108 are mounted in the housings 103 and 104.

In FIGURES 7 and 8 the cylinders 67 and 68 replace the housing 61 and these cylinders control the rotation of the sprocket 63 through the reversing valve 70 and levers 71 as in FIGURE 4.

The operating instrumentalities illustrated in FIGURE 4 may be used with jeeps, trucks, trailers, or other equipment or machines. The turntable 65 may be provided with rollers 73 or may be mounted by suitable means.

As illustrated in FIGURE 5 the jeep may be provided with hydraulic steering means including a cylinder 74 connected by tubes 75 and 76 to a control element 77 having a hand lever 78 which is a double acting valve that will steer the vehicle by controlling the cylinder 74 extended therefrom and formed to be positioned within reach of an operator on a seat of the vehicle. The tubes 75 and 76 are provided with quick change couplings 79 and 80 whereby the tubes may be connected to lock the wheels and hold the piston of the cylinder 74 is a fixed position for locking this unit of the steering mechanism. The piston rod 81 of the cylinder 74 is pivotally connected by a pin 82 to a tie rod 83 of the jeep and the opposite end of the cylinder is pivotally connected by a strut 84 to the chassis 85 by a pin 86. The tie rod 83 is conventional and is connected to the front wheels of the jeep by conventional means. When the back hoe is not in use the cylinder 74 is cut out, crossing or connecting the tubes 75 and 76 by connecting couplers 79 and 80 on the hydraulic cylinder side.

This means for controlling steering of a vehicle permits the vehicle to be controlled from the back hoe or from a cab or other part of the jeep. The steering means may also be used to steer farm tractors with back hoe attached, and other vehicles.

With the parts mounted and operated in this manner and with the fluid connections extended through the bushing 31 in the center of the turntable mounting the turntable may be actuated through 360 degrees making it possible to extend the hoe in substantially any direction from the platform or chassis of the jeep.

The hydraulic motor for actuating the turntable may be provided as illustrated in FIGURE 3 or hydraulic motors of the designs illustrated in my co-pending application with the Serial No. 644,346 filed March 6, 1957, now abandoned, may be used on, or below, or in combination with the turntable and mounting thereof.

The pump or reservoir 21 may be directly connected to the hydraulic pump of the tractor or may be actuated independently and the fluid pressure connections of the pump may be controlled by a hand lever as indicated by the numeral 59.

With the parts assembled as illustrated and described it is possible to control the vehicle from the back hoe and being able to steer the jeep or truck from the jeep makes it possible to move the back hoe forward by pushing with the boom and the jeep can be moved rearwardly by pulling with the back hoe boom.

It will be understood that other modifications, within the scope of the appended claim, may be made in the design and arrangement of the parts without departing from the spirit of the invention.

What is claimed is:

The control for a hoe that is mounted on a truck having a chassis providing a bed, a turntable, rotatably mounted on the bed of the chassis, the improvement comprising a sleeve fixed to the bed of the chassis, a stationary gear mounted on said sleeve in fixed relation thereto and positioned below the turntable in spaced parallel relation thereto, a bearing mounted in said sleeve, a hub fixed to said turntable and rotatably mounted in said bearing so that the axis of the gear is in vertical alignment with the axis of the turntable, a hydraulic motor mounted on the turntable and having a shaft extended downwardly therefrom, a pinion mounted on the shaft of the hydraulic motor and positioned to mesh with teeth of the stationary gears to rotate said turntable to 360 degrees, a pump for supplying fluid to said motor and fluid supply lines extended from said pump through said sleeve for connection to said motor.

References Cited in the file of this patent

UNITED STATES PATENTS

| | | |
|---|---|---|
| 1,498,846 | Larsen | June 24, 1924 |
| 2,383,172 | Wagner | Aug. 21, 1945 |
| 2,781,134 | Weir | Feb. 12, 1957 |
| 2,812,872 | Perkins | Nov. 12, 1957 |
| 2,838,183 | McIntyre | June 10, 1958 |
| 2,852,149 | Bruneri | Sept. 16, 1958 |

OTHER REFERENCES

Harischfeger Corp., Publication on P and H Truck Cranes, Bulletin Number TX–107, printed in May 1946. (Copy in Div. 4, Class 212, Subclass 38.)